United States Patent
Ogawa et al.

(10) Patent No.: US 6,875,359 B2
(45) Date of Patent: Apr. 5, 2005

(54) DEVELOPER WASTE LIQUID REGENERATING APPARATUS AND METHOD

(75) Inventors: Shu Ogawa, Tokyo (JP); Yasuyuki Kobayakawa, Tokyo (JP); Yoshiya Kitagawa, Yokohama (JP); Makoto Kikukawa, Yokohama (JP)

(73) Assignees: Nagase & Co., Ltd. (JP); Nagase CMS Technology Co., Ltd. (JP)

( * ) Notice: Subject to any disclaimer, the term of this patent is extended or adjusted under 35 U.S.C. 154(b) by 205 days.

(21) Appl. No.: 10/305,796

(22) Filed: Nov. 27, 2002

(65) Prior Publication Data

US 2004/0099602 A1 May 27, 2004

(51) Int. Cl.[7] ............................................. B01D 61/00
(52) U.S. Cl. .................... 210/652; 210/651; 430/399; 430/400
(58) Field of Search ............................ 210/652, 651, 210/195.2, 257.2; 430/399, 400

(56) References Cited

U.S. PATENT DOCUMENTS

| | | | |
|---|---|---|---|
| 5,607,592 A | * | 3/1997 | Bernard et al. ............. 210/641 |
| 6,083,670 A | * | 7/2000 | Sugawara et al. .......... 430/399 |
| 6,117,315 A | * | 9/2000 | Masson .................... 210/195.2 |
| 6,187,519 B1 | * | 2/2001 | Sugawara ................... 430/399 |
| 6,723,247 B2 | * | 4/2004 | Martin ........................ 210/652 |

FOREIGN PATENT DOCUMENTS

| | | | | |
|---|---|---|---|---|
| JP | Kokai Hei 5-40345 | * | 2/1993 | |
| JP | 8-62852 | | 3/1996 | ............. G03F/7/30 |
| JP | 11-192481 | | 7/1999 | ............. C02F/1/44 |
| JP | 11-262765 | | 9/1999 | ............. C02F/1/44 |

* cited by examiner

*Primary Examiner*—Ana Fortuna
(74) *Attorney, Agent, or Firm*—Osha & May L.L.P.

(57) ABSTRACT

A developer liquid regenerating system is provided with a storage tank storing a TAAH (such as TMAH)- and photoresist-containing developer waste liquid, first separating means with NF membrane, connected to the waste liquid storage tank through conduits, a storage tank connected to the first separating means through a conduit, and second separating means with NF membrane, connected to the storage tank through conduits. The developer liquid regenerating system is also connected to a developing apparatus through a conduit connected to the storage tank, and to a developer liquid control/supply apparatus through a conduit connected to the storage tank.

6 Claims, 2 Drawing Sheets

DEVELOPER WASTE LIQUID REGENERATING APPARATUS AND METHOD

BACKGROUND OF THE INVENTION

1. Field of the Invention

The present invention relates to a developer waste liquid regenerating apparatus and method.

2. Related Background Art

In recent years, manufacture of electronic parts such as semiconductors, liquid crystals, printed boards and the like has been accomplished by a manufacturing process involving formation of a negative or positive photoresist film on a substrate such as an Si wafer as the film-forming step, irradiation of light or the like through a pattern mask as the irradiation step, using a developer liquid to dissolve unwanted photoresist as the developing step, etching treatment as the etching step and removal of the insoluble photoresist film from the substrate as the stripping step.

The developer liquid used for the developing step is usually tetraalkylammonium hydroxide (hereinafter referred to as "TAAH"). Developer waste liquids discharged from developing steps therefore contain dissolved photoresist and TAAH.

One method of treating developer waste liquids is the method for pretreatment and regeneration of TAAH-containing waste liquids disclosed in Japanese Unexamined Patent Publication HEI No. 11-262765. In the method for pretreatment and regeneration of TAAH-containing waste liquids described in this publication, the TAAH-containing waste liquid is neutralized in a suitable acid to precipitate the photoresist in the waste liquid. The TAAH-containing waste liquid is then introduced into a membrane separator to separate and remove the solid portion (consisting mainly of photoresist). The TAAH-containing liquid from which the solid portion has been removed by the membrane separator is concentrated using an evaporator for concentration and volume reduction of the TAAH-containing liquid.

This solid-free and neutralized TAAH-containing liquid is then regenerated by electrodialysis. Purified water or fresh TAAH is added to the obtained concentrated TAAH liquid to adjust the concentration for reutilization as a developer liquid for electronic parts.

Also, Japanese Unexamined Patent Publication HEI No. 11-192481 discloses a technique wherein a nanofiltration membrane is used for membrane separation of the photoresist developer waste liquid to obtain a concentrate containing impurities such as mainly the photoresist and a permeating liquid containing mainly tetraalkylammonium ion.

SUMMARY OF THE INVENTION

However, in the method for pretreatment and regeneration of TAAH-containing waste liquids disclosed in Japanese Unexamined Patent Publication HEI No. 11-262765, the permeable membrane used in the membrane separator is fragile with respect to alkalis and can only be used at a pH of 10 or lower, such that neutralization of the strongly alkalinic TAAH-containing waste liquid must be carried out with an appropriate acid.

In addition, since TAAH converts to a salt when neutralized, regeneration of the TAAH-containing liquid requires treatment such as electrodialysis. However, because the equipment necessary for electrodialysis is usually situated at a location distant from the semiconductor manufacturing plant, it has been necessary to transport the neutralized TAAH-containing liquid from the semiconductor manufacturing plant to the location of the electrodialysis equipment.

Various transportation means such as trucks are used for the transport, and such transport is therefore undesirable from the standpoint of hauling energy and treatment cost. Moreover, since waste material treatment is a social issue, construction of a system which minimizes waste products is desirable.

In Japanese Unexamined Patent Publication HEI No. 11-192481, the nanofiltration membrane is relatively weak with respect to high pH alkaline solutions, and therefore neutralization (adjustment) to a pH of 12 or below is indicated as being necessary. As mentioned above, TAAH converts to a salt when neutralized, and therefore electrodialysis is required as in the method described above. This publication mentions a pretreatment step and post-treatment step for the developer waste liquid, but this is undesirable because the number of steps tends to increase for regeneration of the developer waste liquid.

Moreover, although this publication describes the membrane separation treatment in multistages, it neither discloses nor suggests concentration of the TAAH-containing liquid by cross-flow membrane separation (circulating membrane filtration). Also, even though the publication mentions the use of a nanofiltration membrane with a molecular weight cutoff (fractionating molecular weight) in the range of 100–1000, it neither discloses nor suggests using a plurality of nanofiltration membranes with different molecular weight cutoff within this range.

The present invention has been accomplished in light of these circumstances, and its object is to provide a developer waste liquid regenerating apparatus and method capable of easily regenerating TAAH-containing liquids from developer waste liquids at on-site locations such as semiconductor manufacturing plants.

In order to solve the problems referred to above, the developer waste liquid regenerating apparatus of the invention is provided with a developer waste liquid transportation member which transports developer waste liquid containing tetraalkylammonium hydroxide and a photoresist, a first storage tank which stores the transported developer waste liquid, first separating means with a first nanofiltration membrane, which separates the developer waste liquid stored in the first storage tank into a tetraalkylammonium hydroxide-containing first permeating liquid and a first non-permeating component, a second storage tank which stores the first permeating liquid, and second separating means with a second nanofiltration membrane having a different molecular weight cutoff from the first nanofiltration membrane, which separates the first permeating liquid stored in the second storage tank into a second permeating liquid and a tetraalkylammonium hydroxide-containing second non-permeating component.

"Nanofiltration membrane" will hereinafter be abbreviated as "NF membrane".

In a developer waste liquid regenerating apparatus having such a construction, a first NF membrane with high resistance against strong alkalis is used for separation of the TAAH-containing first permeating liquid and the first non-permeating component, so that the first permeating liquid and the first non-permeating component can be separated without neutralization of the developer waste liquid. Also, since a second NF membrane with a different molecular weight cutoff than the first NF membrane is used to separate the first permeating liquid stored in the second storage tank into a second permeating liquid and a TAAH-containing second non-permeating component, highly precise membrane separation is accomplished, and a concentrated and volume-reduced TAAH-containing liquid is obtained.

This prevents the need for electrodialysis in a later step, to thereby eliminate the hauling energy and treatment cost required for transport of neutralized TAAH-containing liquids.

Moreover, since the separated TAAH-containing liquid can be reutilized, it is possible to achieve more effective utilization of resources and vastly reduce waste liquid volume at semiconductor manufacturing plants and the like. It is therefore possible to lower chemical purchase expenses and waste liquid treatment expenses.

In addition, since the generated developer waste liquid is directly transported to the apparatus of the invention, it is possible to accomplish regeneration of the developer waste liquid at on-site locations such as semiconductor manufacturing plants. For example, when a developer liquid is used in a semiconductor manufacturing process to dissolve unwanted photoresist, thereby producing a developer waste liquid containing TAAH and the photoresist, the developer waste liquid is transported directly to a first storage tank for so-called on-site developer waste liquid regeneration.

Also, since the TAAH-containing first permeating liquid stored in the second storage tank is separated into the second permeating liquid and the TAAH-containing second non-permeating component, it is possible to obtain a TAAH-containing liquid with an increased TAAH concentration.

There is also preferably provided a first transportation member to transport the first non-permeating component to the first storage tank.

The first non-permeating component separated in the first separating means can thus be transported to the first storage tank, thereby allowing cross-flow membrane separation of the developer waste liquid. As a result, concentration and volume reduction of the first non-permeating component can be achieved and the volume of waste product to the exterior can be reduced.

There is also preferably provided a second transportation member to transport the second non-permeating component to the second storage tank.

According to this construction the second non-permeating component separated at the second separating means is transported to the second storage tank, thereby allowing cross-flow membrane separation of the TAAH-containing liquid. This permits even greater concentration and volume reduction of TAAH in the TAAH-containing liquid.

There is also preferably provided a supply member which supplies the first permeating liquid or the second non-permeating component, i.e. the TAAH-concentrated solution stored in the second storage tank.

Thus, the first permeating liquid which is a highly concentrated and volume-reduced TAAH-concentrated solution can be directly supplied to equipment connected via a conduit, to allow regeneration and reutilization of the developer waste liquid at on-site locations such as semiconductor manufacturing plants. For example, the highly concentrated TAAH-concentrated solution (first permeating liquid) may be supplied by the supply member to a developer liquid control/supply apparatus such as disclosed in, for example, Japanese Unexamined Patent Publication HEI No. 5-40345, to allow so-called on-site regeneration and reutilization of the developer waste liquid.

The developer waste liquid regenerating method of the invention can be effectively carried out using a developer waste liquid regenerating apparatus according to the invention, and it is provided with a developer waste liquid transporting step wherein a developer waste liquid containing TAAH and a photoresist is transported, a first storage step wherein the transported developer waste liquid is stored in a first storage tank, a first separating step wherein the stored developer waste liquid is separated into a TAAH-containing first permeating liquid and a first non-permeating component using a first NF membrane, a first transport step wherein the first non-permeating component is transported to the first storage tank, a second storage step wherein the first permeating liquid is stored in a second storage tank, a second separating step wherein the first permeating liquid stored in the second storage tank is separated into a second permeating liquid and a TAAH-containing second non-permeating component using a second NF membrane having a different molecular weight cutoff from the first NF membrane, and a second transport step wherein the second non-permeating component is transported to the second storage tank.

The method also preferably includes a supply step wherein the first permeating liquid or the second non-permeating component, i.e. the TAAH-concentrated solution, is supplied stored in the second storage tank.

PREFERRED EMBODIMENT OF THE INVENTION

Figure 1:
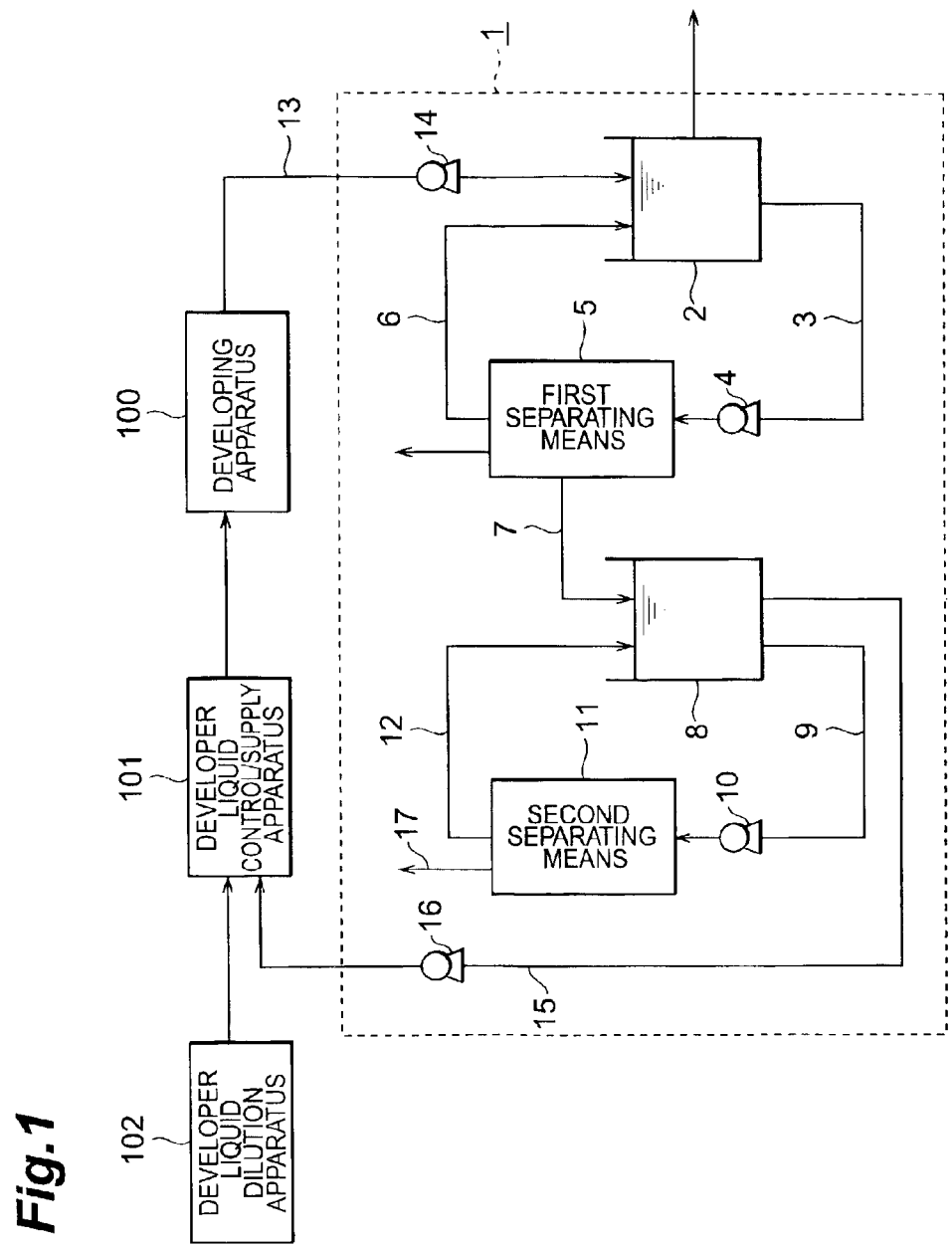
FIG. 1 is a simplified process diagram for an embodiment of a developer waste liquid regenerating apparatus according to the invention.

The developer liquid regenerating system 1 (developer waste liquid regenerating apparatus) shown in FIG. 1 is provided with a storage tank 2 (first storage tank) wherein the developer waste liquid containing TAAH and photoresist is stored, and first separating means 5 connected to the waste liquid storage tank 2 via a conduit 3 with a pump 4, and a conduit 6 (first transportation member).

The first separating means 5 is a membrane separation module with an NF membrane (first NF membrane), and a storage tank 8 (second storage tank) is connected to the first separating means 5 via a conduit 7. Also, second separating means 11 is connected to the storage tank 8 via a conduit 9 with a pump 10, and a conduit 12 (second transportation member). The second separating means 11 is a membrane separation module with an NF membrane (second NF membrane).

The developer liquid regenerating system 1 is also connected to a developing apparatus 100 via a conduit 13 provided with a pump 14 and connected to the storage tank 2, and is also connected to a developer liquid control/supply apparatus 101 via a conduit 15 provided with a pump 16 and connected to the storage tank 8. It is thus constructed with a developer liquid transportation member from the conduit 13 and pump 14, and with a permeating liquid supply member from the conduit 15 and pump 16.

The developing apparatus 100 is connected to the developer liquid control/supply apparatus 101 situated upstream from it, and the developer liquid control/supply apparatus 101 is connected to a developer liquid dilution apparatus 102 situated upstream from it.

The NF membranes in the first separating means 5 and second separating means 11 are functional membranes with high resistance to strong alkalis. As such NF membranes there may be used, specifically, NF membranes produced by Koch Industries Inc. These NF membranes are composite membranes with polysulfone (PS) or polyacrylonitrile (PAN) as matrix materials, and may be used in all pH ranges (pH=0–14). They therefore allow direct introduction of strongly alkaline TAAH-containing developer waste liquids without neutralization.

More specifically, the NF membrane used for the first separating means 5 preferably has a molecular weight cutoff of 700–1300, and for example, there may be used SelRO™ MPS/T-36 by Koch Industries, Inc., having a molecular weight cutoff of 1000. At the first separating means 5, the developer waste liquid is separated into a TAAH-containing liquid (first permeating liquid) and photoresist (first non-permeating component), and an NF membrane with a molecular weight cutoff of 700–1300 is useful for this purpose.

The NF membrane used for the second separating means 11 preferably has a molecular weight cutoff of 100–300, and for example, there may be used SelRO™ MPS/T-34 by Koch Industries, Inc., having a molecular weight cutoff of 200. At the second separating means 11, as described below, the TAAH-containing liquid (first permeating liquid) is separated into water (second permeating liquid) and a TAAH-containing liquid with a higher TAAH concentration (second non-permeating component), and an NF membrane with a molecular weight cutoff of 100–300 is useful for this purpose.

The NF membranes used for the first separating means 5 and second separating means 11 may be appropriately selected as permeable membranes with high resistance to alkalinity, and there are no particular restrictions on the NF membranes.

An example of a developer waste liquid regenerating method using the developer liquid regenerating system 1 with such a construction will now be explained.

First, a developer liquid diluting apparatus such as disclosed in Japanese Unexamined Patent Publication HEI No. 8-62852, for example, is used as the developer liquid diluting apparatus 102. The highly concentrated developer stock liquid is diluted to with high precision by the developer liquid diluting apparatus 102, and the diluted developer stock liquid is then supplied to the developer liquid control/supply apparatus 101.

A developer liquid control/supply apparatus such as disclosed in Japanese Unexamined Patent Publication HEI No. 5-40345, for example, is used as the developer liquid control/supply apparatus 101. The developer liquid control/supply apparatus 101 accomplishes high-precision control of the TAAH concentration with a conductivity meter, and developer liquid of stable quality is supplied to the developing apparatus 100. The developer liquid supplied to the developing apparatus 100 contains, for example, approximately 2.38% tetramethylammonium hydroxide (hereinafter referred to as "TMAH") as a type of TAAH.

At the developing apparatus 100, for example, a negative or positive photoresist film is formed on a substrate such as an Si wafer, after which light, etc. is irradiated through a pattern mask and a TAAH-containing developer liquid is used to dissolve unwanted photoresist. The developer waste liquid discharged from the developing apparatus 100 is transported directly to and stored in the storage tank 2 through the conduit 13 and pump 14 mentioned above.

The developer waste liquid in the storage tank 2 is supplied to the first separating means 5 through the conduit 3 and pump 4. The first separating means 5 separates the developer waste liquid into a TMAH-containing first permeating liquid and a photoresist-containing first non-permeating component.

The first non-permeating component is transported (returned) to the storage tank 2 through the conduit 6. There remain in the storage tank 2, therefore, water, a slight amount of alkali, and a high concentration of photoresist. The high concentration of photoresist is discarded by appropriate discharge as waste material out of the system.

On the other hand, the first permeating liquid which contains 0.5% TMAH is transported to and stored in the storage tank 8 through the conduit 7. The first permeating liquid stored in the storage tank 8 is supplied to the second separating means 11 through the conduit 9 and pump 10. The first permeating liquid is separated (filtered) by the second separating means 11 into water as the second permeating liquid and a second non-permeating component containing TMAH at a higher concentration.

The second non-permeating component, which is a highly concentrated TAAH concentrate, is transported (returned) to the storage tank 8 through the conduit 12, and resupplied to the second separating means. This cross-flow membrane separation results in further high concentration of the TMAH. In this example, the circulating treatment is preferably carried out so that the TMAH concentration in the storage tank 8 reaches, for example, 2.38% or greater.

In other words, since a developer liquid containing 2.38% TMAH is used at the developing apparatus 100, cross-flow membrane separation is carried out at the second separating means 11 and the storage tank 8 until the TMAH concentration exceeds 2.38%, and the TMAH concentrated liquid is diluted to a concentration of 2.38% at the developer liquid control/supply apparatus 101. Incidentally, the TMAH-containing liquid in the storage tank 8 may be transported to the developer liquid control/supply apparatus 101 before the TMAH concentration reaches 2.38%, and the concentration adjusted so that the TMAH concentration is 2.38% in the developer liquid control/supply apparatus 101.

When the TMAH concentration in the storage tank 8 exceeds 2.38%, the TMAH-containing liquid is supplied directly to the developer liquid control/supply apparatus 101 through the conduit 15 and pump 16.

At the developer liquid control/supply apparatus 101, the concentration is precisely adjusted to produce a developer liquid with a TMAH concentration of 2.38% for use in the developing apparatus 100. The concentration-adjusted developer liquid is reutilized at the developing apparatus 100. Thus, the developer waste liquid may be recycled for use on-site, for example, at a semiconductor manufacturing plant.

Meanwhile, the water as the second permeating liquid is discharged out of the system through the conduit 17, and if necessary is reutilized as industrial water, or is subjected to ordinary waste water treatment.

The first separating means 5 and second separating means 11 will now be explained in detail.

Figure 2:
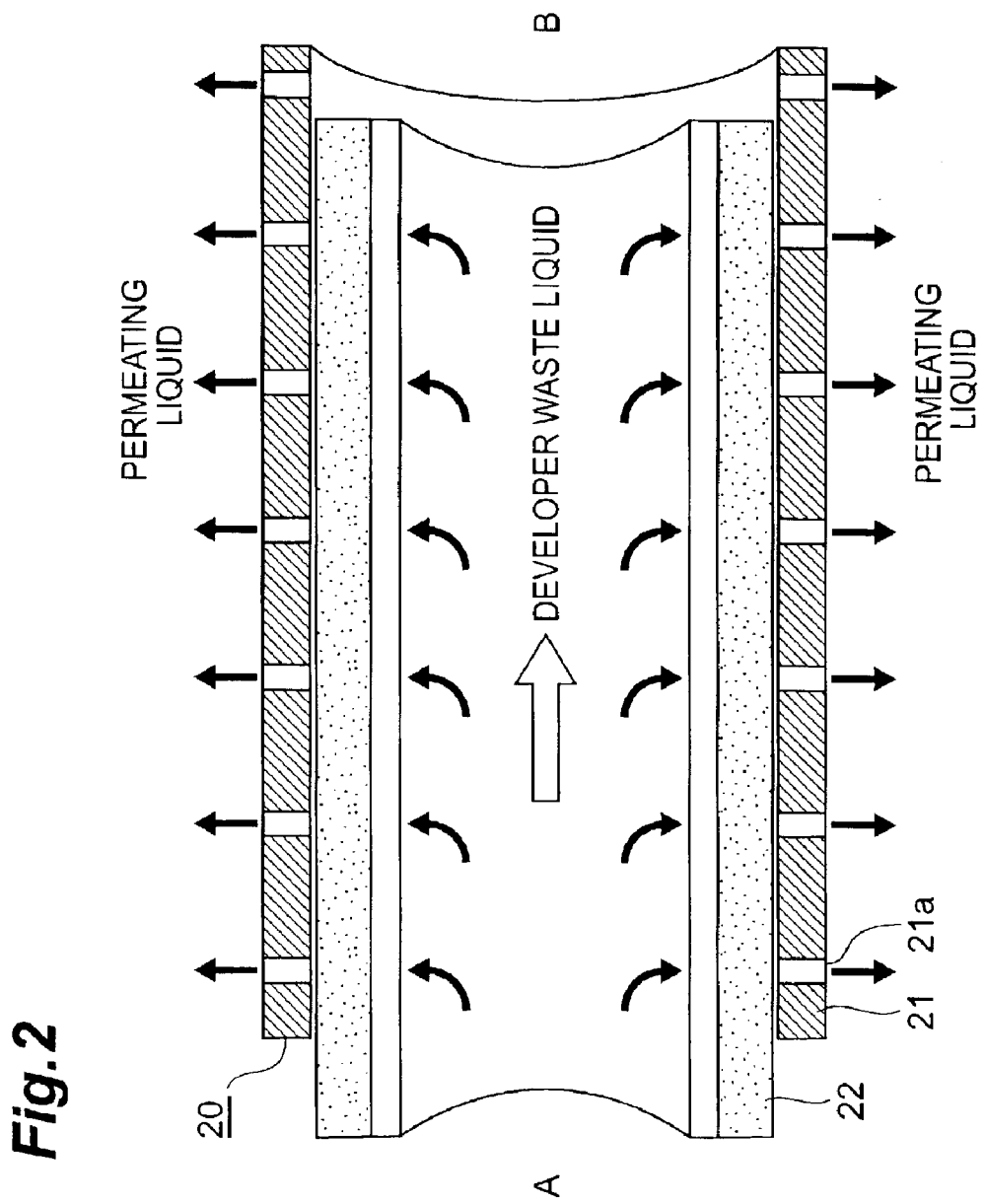
FIG. 2 is a cross-sectional view showing a portion of a membrane separation module as the first separating means 5.

FIG. 2 shows the membrane separation module 20 constructed of a support pipe 21 made of stainless steel, and a tubular-shaped NF membrane 22 (first NF membrane) provided in a manner fitted inside the support pipe 21.

A plurality of fine holes 21a are provided in the support pipe 21. The NF membrane 22 is provided in a detachable manner with respect to the support pipe 21. The NF membrane 22 is not limited to a tubular shape, and may instead be, for example, spiral-shaped.

When membrane separation treatment is carried out in the first separating means 5, the developer waste liquid is supplied into the NF membrane 22 through the introduction end A as shown in FIG. 2. The internal pressure at the introduction end A is set to be a higher pressure than at the exit end B (preferably about 2–40 kg/cm$^2$, and more preferably 30–40 kg/cm$^2$).

Thus, the TMAH-containing permeating component (first permeating liquid) in the developer waste liquid passes through the fine pores in the NF membrane 22, and then through the holes 21a in the support pipe 21 to reach the exterior of the support pipe 21, where it is transported through the conduit 7 to the storage tank 8 as described above.

Meanwhile, the photoresist-containing non-permeating component (first non-permeating component) which cannot pass through the fine pores of the NF membrane 22 is introduced from the exit end B to the conduit 6, and passes through the conduit 6 to be returned to the storage tank 2, as mentioned above. Cross-flow membrane separation of the developer waste liquid is carried out in this manner, to achieve concentration of TAAH and concentration and volume reduction of the photoresist.

The second separating means 11 is generally constructed with the same members as the first separating means 5. That is, the construction is the same as that of the first separating means 5 shown in FIG. 2, except that an NF membrane (second NF membrane) with a molecular weight cutoff suitable for use in the second separating means 11, as explained above, is used instead of the NF membrane 22 in the first separating means 5.

For membrane separation in the second separating means 11, the TAAH-containing first permeating liquid is supplied from the introduction end A in FIG. 2 to the NF membrane 22. Here, the internal pressure at the introduction end A is set to be a higher pressure than at the exit end B, as explained above.

Thus, the water (second permeating liquid) passes through the fine pores of the NF membrane 22, and then through the holes 21a in the support pipe 21 to reach the exterior of the support pipe 21, where it is transported through the conduit 17 to the exterior as described above.

Meanwhile, the TAAH-containing non-permeating component (second non-permeating component) which cannot pass through the fine pores of the NF membrane 22 is introduced from the exit end B to the conduit 12, and passes through the conduit 12 to be returned to the storage tank 8, as mentioned above. Cross-flow membrane separation of the first permeating liquid is carried out in this manner, to achieve further concentration and volume reduction of the TMAH and to obtain a TMAH-containing liquid of even greater concentration.

Here, the NF membrane used for the second separating means 11 is preferably one which passes relatively low atomic weight monovalent metal ions such as Li$^+$, Na$^+$ and K$^+$. This can reduce the amounts of these metal ions in the TAAH (such as TMAH) concentrated liquid, to allow sufficient exclusion of the adverse effects of these metal ions on the manufacturing steps for semiconductors or the like.

The developer liquid regenerating system 1 constructed in this manner, and a developer waste liquid regenerating method employing it, can separate a developer waste liquid into a TAAH (such as TMAH)-containing first permeating liquid and a first non-permeating component without neutralization treatment of the developer waste liquid.

Furthermore, using a second nanofiltration membrane with a different molecular weight cutoff than the first nanofiltration membrane separates the first permeating liquid stored in the second storage tank into a second permeating liquid and a TAAH-containing second non-permeating component, such that high precision membrane (filtration) separation can be accomplished to obtain a concentrated and volume-reduced TAAH-containing liquid.

As a result, it is possible to eliminate the need for electrodialysis in subsequent steps and to reduce hauling energy and treatment cost required for transport of neutralized TAAH-containing liquids, thereby providing an economic advantage.

Furthermore, since the separated TAAH-containing liquid can be reutilized, it is possible to achieve more effective utilization of resources and vastly reduce waste liquid volume at semiconductor manufacturing plants and the like. It is therefore possible to lower chemical purchase expenses and waste liquid treatment expenses to achieve greater improvement in economy.

In addition, since the developer waste liquid is directly transported to the apparatus of the invention, it is possible to accomplish regeneration of the developer waste liquid at on-site locations such as semiconductor manufacturing plants. For example, when a developer liquid is used in a semiconductor manufacturing process to dissolve unwanted photoresist, thereby producing a developer waste liquid containing TAAH and the photoresist, the developer waste liquid may be transported directly to a first storage tank for so-called on-site developer waste liquid regeneration.

Also, since the TAAH-containing first permeating liquid stored in the second storage tank can be separated into the second permeating liquid and the TAAH-containing second non-permeating component, it is possible to obtain a TAAH-containing liquid with an increased TAAH concentration.

As explained above, the developer waste liquid regenerating apparatus and method of the invention allow easier regeneration of TAAH-containing liquids from developer waste liquids at on-site locations such as semiconductor manufacturing plants.

What is claimed is:

1. A developer waste liquid regenerating apparatus comprising:

a developer waste liquid transportation member which transports developer waste liquid containing tetraalkylammonium hydroxide and a photoresist, a first storage tank which stores said transported developer waste liquid, first separating means with a first nanofiltration membrane, which separates the developer waste liquid stored in said first storage tank into a tetraalkylammonium hydroxide-containing first permeating liquid and a first non-permeating component, the first nanofiltration membrane having a molecular weight cutoff of 700 to 1300, a second storage tank which stores said first permeating liquid, and second separating means with a second nanofiltration membrane having a different molecular weight cutoff from said first nanofiltration membrane, which separates the first permeating liquid stored in said second storage tank into a second permeating liquid and a tetraalkylammonium hydroxide-containing second non-permeating component, the second nanofiltration membrane having a molecular weight cutoff of 100 to 300.

2. A developer waste liquid regenerating apparatus according to claim 1, provided with a first transportation member which transports said first non-permeating component to said first storage tank.

3. A developer waste liquid regenerating apparatus according to claim 1, provided with a second transportation member which transports said second non-permeating component to said second storage tank.

4. A developer waste liquid regenerating apparatus according to claim 1, provided with a supply member which supplies said first permeating liquid or said second non-permeating component stored in said second storage tank to equipment via a conduit.

5. A developer waste liquid regenerating method comprising a developer waste liquid transporting step wherein a developer waste liquid containing tetraalkylammonium hydroxide and a photoresist is transported, a first storage step wherein said transported developer waste liquid is stored in a first storage tank, a first separating step wherein said stored developer waste liquid is separated into a tetraalkylammonium hydroxide-containing first permeating liquid and a first non-permeating component using a first nanofiltration membrane, a first transport step wherein said first non-permeating component is transported to said first storage tank, a second storage step wherein said first permeating liquid is stored in a second storage tank, a second separating step wherein the first permeating liquid stored in said second storage tank is separated into a second permeating liquid and a tetraalkylammonium hydroxide-containing second non-permeating component using a second nanofiltration membrane having a different molecular weight cutoff from said first nanofiltration membrane, and a second transport step wherein said second non-permeating component is transported to said second storage tank.

6. A developer waste liquid regenerating method according to claim 5, further provided with a supply step wherein said first permeating liquid or said second non-permeating component stored in said second storage tank is supplied.

* * * * *